United States Patent [19]

Dörfler et al.

[11] Patent Number: 4,951,502
[45] Date of Patent: Aug. 28, 1990

[54] PRESSURE PROBE

[75] Inventors: Reiner Dörfler, Nuremberg; Gerhard Hettich, Dietenhofen; Hans-Dieter Schmid, Nuremberg, all of Fed. Rep. of Germany

[73] Assignee: Robert Bosch GmbH, Stuttgart, Fed. Rep. of Germany

[21] Appl. No.: 425,165

[22] PCT Filed: Nov. 28, 1987

[86] PCT No.: PCT/DE87/00556
§ 371 Date: Aug. 18, 1989
§ 102(e) Date: Aug. 18, 1989

[87] PCT Pub. No.: WO88/06982
PCT Pub. Date: Sep. 22, 1988

[30] Foreign Application Priority Data

Mar. 19, 1987 [DE] Fed. Rep. of Germany ....... 3708937

[51] Int. Cl.⁵ .................... B60C 23/04; G01L 9/16
[52] U.S. Cl. ..................... 73/146.5; 73/754; 73/756; 340/442
[58] Field of Search ............ 73/146.5, 146.8, 720, 73/721, 727, 706, 756, 754, 146.3, DIG. 4; 338/4; 137/227; 340/442

[56] References Cited

U.S. PATENT DOCUMENTS 4,768,375 9/1988 Eckardt et al. ................ 73/146.5

FOREIGN PATENT DOCUMENTS 3523774 1/1987 Fed. Rep. of Germany .

Primary Examiner—Donald O. Woodiel
Attorney, Agent, or Firm—Michael J. Striker

[57] ABSTRACT

A pressure probe is suggested which serves to determine the air pressure in the interior of tubeless tires on motor vehicle wheels comprising a rim. The pressure probe (10) carries a substrate (26) in a front recess (31) of the probe housing (14) facing the tire interior, at least one sensing element (24) being arranged at the substrate (26) in the outer area on the side remote of the tire interior. In order to keep the air in the vehcile tire at a distance from the sensing elements (24) on the one hand, but transmit the air pressure to the latter without falsification on the other hand, a circumferentially extending cut out portion (36) in the housing area below the sensing elements (34) is filled with a non-conducting magnetic fluid (37), a permanent magnet (39) being arranged at the base (38) of the cut out portion (36), which permanent magnet (39) secures the magnetic fluid (37) for the purpose of covering the sensing elements (24) so as to be free of stresses (FIGURE).

4 Claims, 1 Drawing Sheet

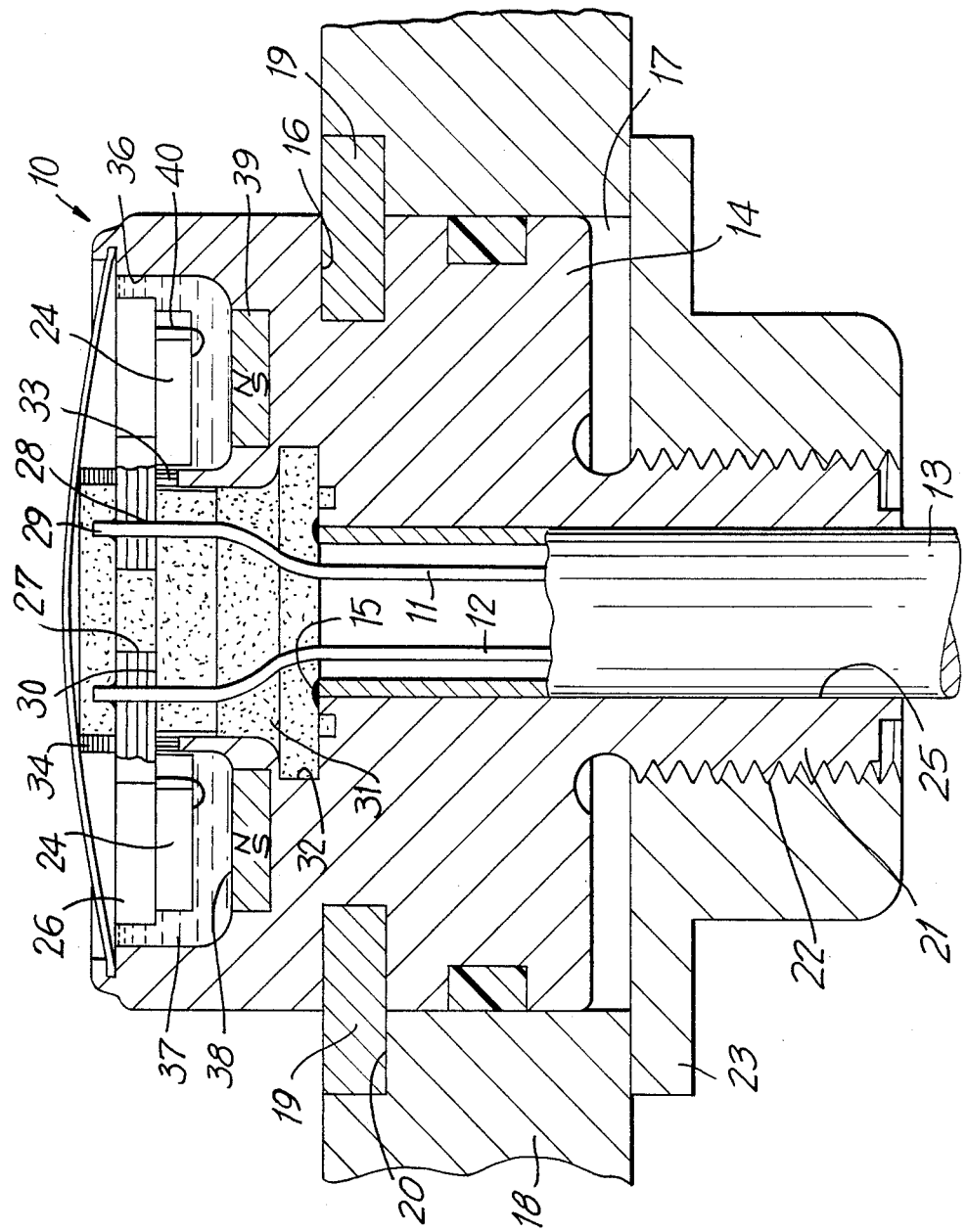

PRESSURE PROBE

FIELD OF THE INVENTION

The invention is based on a pressure probe for detecting the air pressure in a tubeless tire mounted on the rim of a motor vehicle.

BACKGROUND OF THE INVENTION

In known pressure probe of this type (DE-OS No. 35 23 774) the sensing elements are arranged in a corresponding recess on the front side of the probe housing in the outer area of a ceramic substrate on the side remote of the tire interior, wherein the gap between the substrate with the sensing elements and the housing recess is filled with a silicone gel. The silicone gel protects the sensing elements and their connections on the one hand and, on the other hand, enables the transmission of the air pressure in the tire and to the sensing elements.

However, under certain conditions measurement falsifications can occur at the sensing elements which are brought about by the stress states in the gel. Such stress states occur because of thermal expansion, centrifugal forces, etc.

It is attempted with the present invention to improve the measuring accuracy of such a pressure probe in that falsifications of measured values can be prevented to a great extent by means of covering the sensing elements.

SUMMARY OF THE INVENTION

The solution, according to the invention, with the characterizing features of the main claim has the advantage that inner stress states of the material covering the sensing elements can be prevented by means of using magnetic fluid. The measuring accuracy as well as the reproducibility and the hysteresis response of the pressure probe can be improved accordingly. In addition, the magnet arrangement ensures that the fluid is secured in the probe area against gravitational and centrifugal forces as well as against acceleration forces generally occurring at the vehicle. Moreover, the transmission of the air pressure to the sensing elements is not impaired by means of this.

A particularly advantageous solution consists in that the permanent magnet is embedded in a ring-shaped manner in the base of the annular housing cut-out portion for the magnetic fluid. This promotes a simple manufacturing of the probe housing and a simple attachment of the permanent magnets as well as a uniform securing of the electrically insulating magnetic fluid in the annular housing cut-out portion.

BRIEF DESCRIPTION OF THE DRAWINGS

An embodiment example is shown in the drawing and explained in more in the following description. The FIGURE shows a through a pressure probe which is inserted in a rim.

DESCRIPTION OF THE EMBODIMENT OF THE INVENTION

The pressure probe for determining the air pressure in a vehicle tire is designated by 10 in the FIGURE. Its connection lines 11, 12 are received in a high-grade steel pipe 13 whose upper end is laser welded with the housing 14 of the pressure probe 10 by means of a welding seam 15. The housing 14 of the pressure probe 10 comprises a circumferentially extending annular groove 16 on the outside. During assembly, the housing 14 is slid in from the outside through a bore hole 17 of a vehicle rim 18, whereupon annular half-disks 19 are inserted into the annular groove 16 from both sides and outwardly secured in the radial direction by means of a pocket bore hole 20 at the inside of the rim bore hole 17 and come to rest there in such a way that the upper side terminates in a flush manner with the outer surface of the rim 18. In an area of the pressure probe 10 projecting out of the rim bore hole 17, the housing 14 is provided with a threaded projection 21 which carries an external thread 22. A union nut 23 comprising an internal thread is screwed over this threaded projection 21, wherein the union nut 23 overlaps the rim bore hole 17 externally and in this way enables a clamping of the housing 14 in the rim bore hole 17 by means of the annular half-disks 19. The probe housing 14 with the threaded projection 21 is provided with a longitudinal bore hole 25 in which the pipe 13 engages.

The pressure probe 10 comprises two pressure-sensitive sensing elements 24 which are fastened in the area of the outer edge of a ceramic substrate 26 carrying the latter. These sensing elements 24 are semiconductor pressure pickups, known per se (see the journal "Control Technology Praxis" [Regelungstechnische Praxis], 1982, issue 7, page 223), which makes use of the piezoresistance for forming a pressure signal. Every sensing element 24 thus supplies its own pressure value signal. The ceramic substrate 26 has good heat conduction and comprises a central bore hole 27. Moreover, a plurality of bore holes 28 having a small diameter are likewise provided in the central area around the central bore hole 27. The ends 29 of the connection lines 11, 12 are received in these bore holes 28 and soldered with conductor paths 30 which are applied to the ceramic substrate 26 and connect the sensing elements 24 with the connection lines 11, 12.

A central recess 31 of the housing 14 facing the interior of the tire is provided with an undercut 32 in the front for fastening the ceramic substrate 26 in the housing 14 and for the mechanical and electrical protection of the conductor paths 30 and the sensing elements 24 as well as the contact points. The ceramic substrate 26 is received at the recess 31 with an insulating material ring 33 at the housing 14. Another insulating material ring 34 is arranged at the upper side of the ceramic substrate 26, which insulating material ring 34 surrounds the central bore hole 27 and the contacting points of the conductor ends 29. The housing recess 31 with the undercut 32 and the insulating material rings 33 and 34 and the central bore hole 27 of the ceramic substrate 26 are sealed with an epoxy resin 35. This means that the substrate 26 is well insulated thermally from the housing 14, but they are securely connected with one another radially as well as in the axial direction by means of the epoxy resin 35 without stresses being transmitted to the ceramic substrate 26 by means of this.

The sensing elements 24 are arranged on the rear, that is, on the side of the ceramic substrate 26 remote of the tire interior. In the area below the sensing elements 24, the housing 14 comprises an annular cut out portion 36 which is filled with a non-conducting magnetic fluid 37 and accordingly covers the sensing elements 24 and their bonded connections 40 and protects them from the air in the vehicle tires. However, the air pressure in the vehicle tires is simultaneously transmitted to the sensing elements 24. In order to secure the magnetic fluid 37 in the cut out portion 36 also during the occurrence of gravitational and centrifugal forces, a permanent magnet 39 is arranged at the base 38 of the cut out portion 36. Magnetic forces acting uniformly on the magnetic fluid 37 are achieved in that the permanent magnet 39 is inserted in a ring-shaped manner in the base 38 of the annular housing cut-out portion 36. The magnetization of the permanent magnets 39 is effected in this instance in the axial direction of the pressure probe 10. Since the centrifugal forces effective in the magnetic fluid can act in different directions depending on the arrangement of the pressure probe at the rim 18, it may be advantageous to construct the permanent magnets 39 cylindrically and to magnetize them in the radial direction.

We claim:

1. Pressure probe for determining the air pressure in the interior of tubeless tires of motor vehicle wheels, wherein the pressure probe is fastened in a bore hole of the area of a rim of the wheel, which area opens toward the interior of the tire, and comprises a substrate which is inserted in a front recess of a probe housing, which recess faces the interior of the tire, at least one sensing element is arranged at the substrate in the outer area on the side of the substrate remote of the tire interior, the central area of the substrate making contact with connection conductors, and is fastened in the additional recess of the probe housing, and wherein a circumferentially extending cut out portion is provided in the housing area below the sensing element, of which there is at least one, characterized in that the circumferentially extending cut out portion (36) is filled with a non-conducting, magnetic fluid (37) and a permanent magnet (39) is arranged at its base (38), which permanent magnet (39) secures the magnetic fluid (37) for the purpose of covering the sensing element (24), of which there is at least one, in the cut out portion (36) so as to be free of stresses.

2. Pressure probe according to claim 1, characterized in that the permanent magnet (39) is inserted in the base (38) of the annular housing cut-out portion (36) in an annular manner.

3. Pressure probe according to claim 1 or 2, characterized in that the permanent magnet (39) is magnetized in the axial direction of the pressure probe (10).

4. Pressure probe according to claim 1 or 2, characterized in that the permanent magnet (39) is magnetized in the radial direction.

* * * * *